United States Patent [19]

Fiorentino et al.

[11] Patent Number: 4,848,149
[45] Date of Patent: Jul. 18, 1989

[54] APPARATUS FOR MEASURING THE LEVEL OF LIQUID FUEL IN A TANK

[75] Inventors: Jean-Pierre Fiorentino, Paris; Claude Rougerie, Genevieve des Bois, both of France

[73] Assignee: Shell Oil Company, Houston, Tex.

[21] Appl. No.: 150,001

[22] Filed: Jan. 28, 1988

Related U.S. Application Data

[63] Continuation of Ser. No. 935,433, Nov. 26, 1986, abandoned.

[30] Foreign Application Priority Data

Dec. 1, 1985 [FR] France ............................... 85 17776

[51] Int. Cl.⁴ ............................................. G01F 23/04
[52] U.S. Cl. .......................................... 73/293; 33/723; 250/577
[58] Field of Search .................... 73/293, 327, 308; 33/126.7 A, 169 B; 250/577

[56] References Cited

U.S. PATENT DOCUMENTS

| | | | |
|---|---|---|---|
| 2,213,026 | 8/1940 | Hoffman | 33/126.7 A |
| 2,326,111 | 8/1943 | Zachos | 33/126.7 A X |
| 3,141,094 | 7/1964 | Strickler | 73/293 X |
| 4,077,129 | 3/1978 | Nishikata | 33/169 B X |
| 4,410,020 | 10/1983 | Lorenz | 141/95 X |
| 4,587,845 | 5/1986 | Varga | 73/325 |

FOREIGN PATENT DOCUMENTS

| | | | |
|---|---|---|---|
| 1119532 | 12/1961 | Fed. Rep. of Germany | 73/327 |
| 2560678 | 9/1985 | France . | |

OTHER PUBLICATIONS

Catalog entry (p. 185), from Mitutoyo/MTI Corporation, Paramus, New Jersey.

Primary Examiner—Daniel M. Yasich
Attorney, Agent, or Firm—Mark A. Smith

[57] ABSTRACT

A device for measuring the level of liquid fuel in a tank of the type in which one marks the hollow distance between the surface of the liquid and a horizontal reference plane made near an opening that gives access to the tank. The device includes a depth gauge containing a reference base, a mobile rule and means for measuring the relative displacement of the rule relative to the base; means for support against the reference plane of the tank integral with the reference base of the gauge; an optical probe containing static means for detection of liquid at a predetermined level and means for display that can indicate the presence or absence of liquid at this predetermined level, this optical probe being integral with the mobile rule of the gauge.

2 Claims, 1 Drawing Sheet

U.S. Patent       Jul. 18, 1989       4,848,149
FIG.1
FIG.2
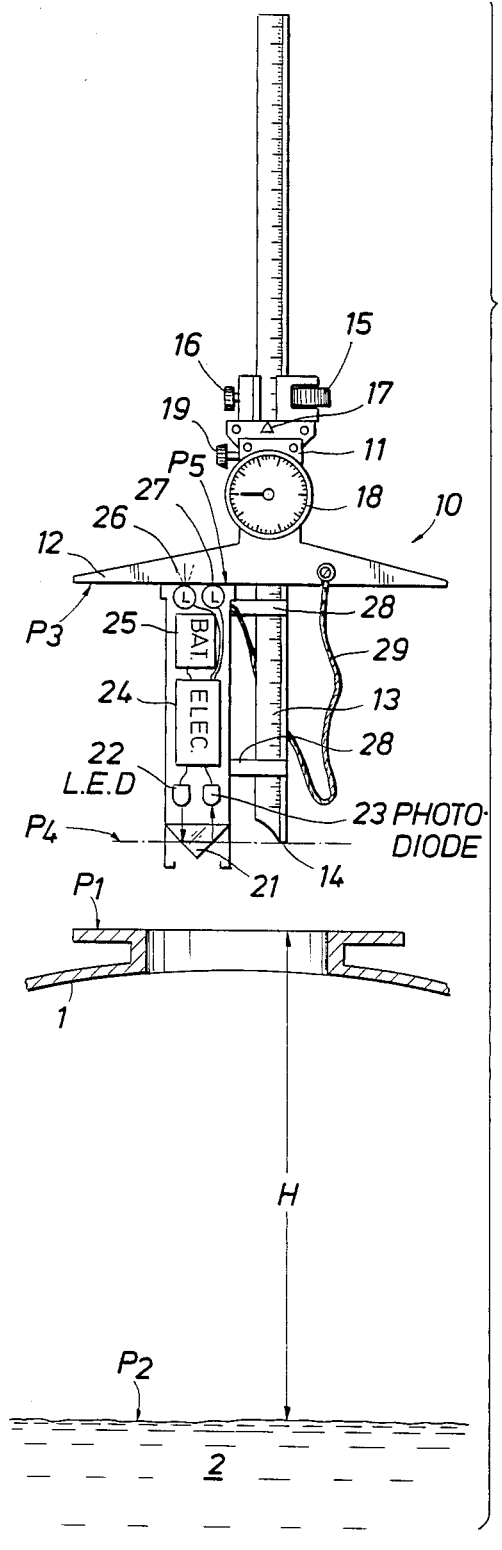
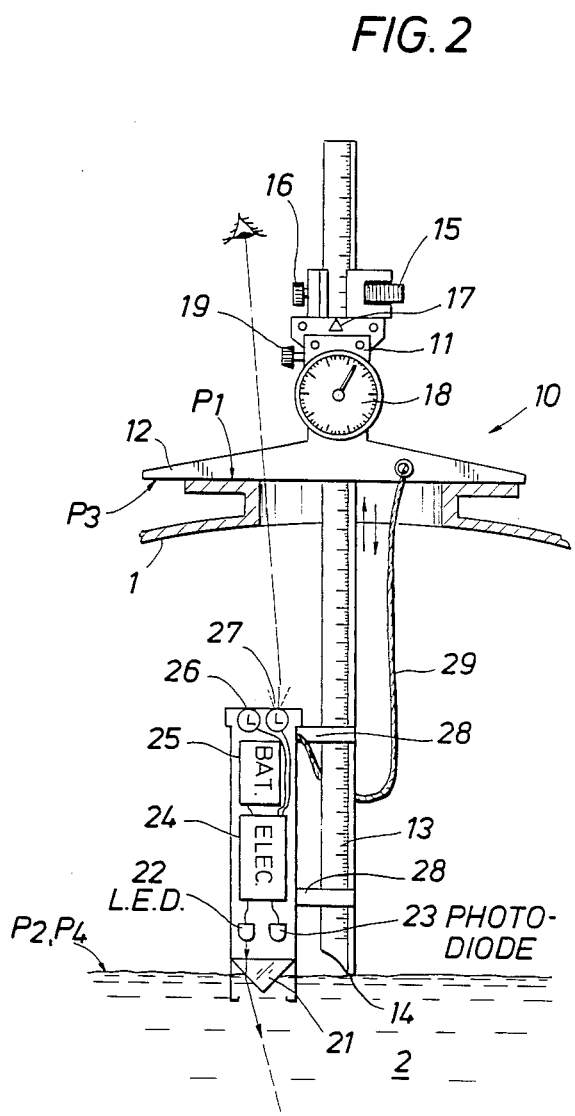

APPARATUS FOR MEASURING THE LEVEL OF LIQUID FUEL IN A TANK

This is a continuation of application Ser. No. 935,433, filed Nov. 26, 1986, now abandoned.

BACKGROUND OF THE INVENTION

The present invention concerns a device for measuring the level of liquid fuel in a tank of the type known under the name "sabre", that is, in which one marks the void space between the surface of the liquid and a reference plane near an opening that gives access to the tank. Generally, two pins are provided against which one rests two similar support surfaces that are integral with the apparatus and which thus determine the degree of penetration of the latter into the tank.

These devices are generally made in the form of a long dipstick carrying marks or graduations that serve as references to determine the wet height, representing the actual level of liquid fuel in the tank.

French patent no. FA-A-2,560,678, published Sept. 6, 1985 in the name of the applicant also describes a refinement to this type of device in which one amplifies the variations of liquid level to increase the accuracy and resolution of the measurement. This document also indicates the special application of devices of this type in surveillance of proper sampling of meters that measure the amount of liquid delivered from the tank, verification that requires good accuracy of level measurement.

One of the purposes of the invention is to increase the accuracy and resolution of these devices, while preserving a device that is easy to use, simple in design and autonomous in function. As regards the last condition, one will recall that measurement of the fuel level is made in an explosive atmosphere which precludes electrical proceses involving switches, capacitive, piezoelectric sensors, positioned in situ and connected to a remote measurement device.

One will see that the device of the invention permits measurement accuracy of about ±0.5 mm and a resolution (smaller detectable variation) of about 0.05 mm. These figures should be compared with the accuracy and resolution of a conventional "sabre", which are both about 1 mm, these figures corresponding to the accuracy of interpretation of the wet height on the graduated part of the sabre.

SUMMARY OF THE INVENTION

For this purpose, the device according to the invention comprises a depth gauge, containing a reference base, mobile rule and means for measurement of the relative displacement of the rule relative to the base; a means of support against the reference plane of the tank, integral with the reference base of the gauge; an optical probe containing static means for detection of liquid at a predetermined level and a means of display to indicate the presence or absence of liquid at this predetermined level, this optical probe being integral with the mobile or portable and selectively movablerule of the gauge. After lowering the probe/rule assembly until the predetermined level coincides with the liquid surface in the tank, the means of measurement provide an indication of the void space between the liquid surface and the reference plane.

The hollow space can therefore be measured with the accuracy of the optical probe and the resolution of the gauge in simple fashion without influencing the measured medium, since the end of the optical probe only slightly penetrates the liquid.

Moreover, it is possible to use a fully autonomous optical probe containing in a sealed box the electronic assembly and its power supply so that the probe conforms to the use standards for electrical devices in an explosive atmosphere. The only part of the probe in contact with the liquid is a static optical element (generally a prism) which is not subject to any electric potential, since detection results from modification of the optical trajectory of light beams emitted by an electroluminescent diode that emits through a transparent window of an antideflagrant box.

Preferably, the upper face of the probe is a reference face supported against the means of support before lowering of the rule so as to permit zero adjustment of the measurement.

BRIEF DESCRIPTION OF THE DRAWINGS

Other characteristics and advantages of the invention will be apparent on reading the detailed specification with reference to the accompanying drawings in which:

FIG. 1 shows the structure of the apparatus assembly before introduction to the tank;

FIG. 2 shows the same apparatus at the moment when one detects and measures the liquid level in the tank.

DESCRIPTION OF PREFERRED EMBODIMENTS

In the figures, reference 1 denotes the tank containing liquid fuel 2; the hollow space H to be measured is the distance separating a reference plane $P_1$ (for example, made by pins on the upper face on the opening of the reservoir) and plane $P_2$ corresponding to the free liquid surface.

The device comprises a depth gauge 10, containing a reference base 11 extended laterally by a traverse member 12 that defines a support plane $P_3$ which comes in contact with the reference plane $P_1$. The gauge also contains a rule 13 that is selectively movable relative to the base so as to measure the depth separating the end 14 of the rule from plane $P_3$ of the traverse member of base 11.

In particular, a wheel 15 is provided that permits micrometer displacement of the rule relative to the base after the screw 16 has been tightened.

Interpretation is carried out on the graduated part of the rule facing index 17 (millimeter interpretation) and by a comparator dial 18 (reading at 1/20th of a millimeter, for example).

A depth gauge suitable for this application is the Mitutoyo type 527-301 gauge whose resolution is 0.05 mm.

On the lower part of the rule 13 an optical probe 20 that is fully autonomous is attached. This probe functions on the following principle: a prism 21 which can come in contact with the liquid is illuminated by an electroluminescent diode 22 so that, in air, total reflection on the faces of the prism returns the light emitted by diode 22 to a photodiode 23. Electronics 24, fed by a built-in battery 25 produces under these conditions illumination of an electroluminescent diode 26 and extinction of another diode 27 (for example, one of another color); other methods of display can be contemplated as variants, for example, a single diode or diodes controlled simultaneously which illuminate when the prism is immersed. The group of elements 22 to 27 is enclosed in a sealed box, diodes 22, 23, 26 or 27 emitting or receiving light through transparent windows of the box.

This box is fixed in the lower part of rule 13 by means of clamps 28 so that the plane $P_4$ containing the reflection points of the light beam on the faces of the prism is located exactly at the level of end 14 of the rule, or shifted from this end 14 by a constant value that is predetermined and known.

Finally, a metal tress 29 is provided, connecting the housing of optical probe 20 to seat or base 11 which assures double function of the tress between the housing box and the gauge (and therefore with the metal wall of the tank when traverse member 12 is supported on the upper face of it) and mechanical holding of the rule/probe assembly to avoid a situation where the operator inadvertently allows the rule to go below its extreme position.

When prism 21 is immersed (FIG. 2), the limited difference in refractive index between the prism material and the liquid means that total reflection disappears, the light beam emitted by diode 22 being simply refracted into the liquid; diode 23 is therefore no longer illuminated, which is detected by electronics 24, providing an indication, for example extinction of luminescent diode 26 and illumination of luminescent diode 27.

An appropriate static optical probe is the Larco type Docil probe which ensures detection accuracy of the level of ±0.5 mm. This probe is autonomous and mounted in a sealed box with no connection to the outside other than the wire (optional) of mass 29.

The operating method of this device will now be described. First, before introducing the device to the tank the operator places plane $P_5$ of the upper face of the optical probe 20 in contact with plane $P_3$ of the traverse 12 of the depth gauge. The operator reads or adjusts the zero of the measurement.

The plane $P_3$ of the traverse 12 having been placed in contact with plane $P_1$ of the opening of the tank, the operator loosens the two screws 16 and 19 and lets the optical probe descend progressively, holding it by the upper part of the rule.

When point 14 of the probe penetrates the liquid (FIG. 2), the electroluminescent diodes visually indicate the change of condition, plane $P_4$ being slightly lowered below the surface $P_2$ of the liquid.

The operator then blocks the rule by means of screw 16 and slowly raises it by means of micrometer screw 15 until a new change in condition is detected (plane $P_4$ slightly above the liquid level).

Finally, the operator then very slowly lowers the probe again, by means of the micrometer screw 15, until a new change in condition is detected; one then considers that planes $P_2$ and $P_4$ coincide.

It is then sufficient for the operator to remove the device and interpret the hollow space H measured by means of the millimeter graduations of the rule facing index 17 and the 1/20th mm graduations on the comparator dial 18.

What is claimed is:

1. An apparatus for measuring a level of liquid in a tank of the type in which there is a hollow space between a surface ($P_2$) of the liquid and a horizontal reference plane ($P_1$) established near an opening that gives access to the tank, comprising:

a depth gauge comprising a reference base, a portable, selectively movable rule and a means for measuring a relative displacement of the rule to the base;

a means for supporting the reference base of the gauge at the reference plane ($P_1$);

an optical probe containing a static means for detection of liquid at a predetermined level ($P_4$), the optical probe being integral with the selectively movable rule and comprising:

a light-emitting diode;

a photodiode;

a prism light-receiving and reflecting communication with the light-emitting diode and photodiode, respectively, such that in a gaseous medium light from the light-emitting diode is reflected off the faces of the prism toward the photodiode, but which reflects little light to the photodiode when the prism is in contact with a liquid;

a means for displaying an indication of the immersion of the optical probe into the liquid at the predetermined level ($P_4$) as a function of the signal from the photodiode;

a power source providing power to the light-emitting diode, the photodiode, and the means for displaying; and an anti-deflagrant box containing the light-emitting diode, the photodiode, the power source, and the means for displaying;

whereby an indication of the depth of the hollow space in the tank is measured by lowering the selectively movable rule into the tank through the opening with the reference base supported at reference plane ($P_1$) to furnish a measurement of the distance between the surface ($P_2$) and the reference base ($P_1$).

2. An apparatus according to claim 1 in which an upper face ($P_5$) of the probe is a reference face capable of being brought against the the means for supporting the reference base before lowering of the selectively movable rule so as to permit zero adjustment of the depth gauge.

* * * * *